(12) United States Patent  
Yap

(10) Patent No.: US 9,396,358 B1  
(45) Date of Patent: Jul. 19, 2016

(54) INTEGRATED CIRCUIT WITH A SELF-DESTRUCTION MECHANISM

(75) Inventor: Chee Wai Yap, Penang (MY)

(73) Assignee: Altera Corporation, San Jose, CA (US)

( * ) Notice: Subject to any disclaimer, the term of this patent is extended or adjusted under 35 U.S.C. 154(b) by 992 days.

(21) Appl. No.: 12/690,054

(22) Filed: Jan. 19, 2010

(51) Int. Cl.
*G06F 21/00* (2013.01)
*G06F 21/76* (2013.01)

(52) U.S. Cl.
CPC ...................................... *G06F 21/76* (2013.01)

(58) Field of Classification Search
USPC .............. 726/22, 23, 24, 25, 26, 34; 713/193, 713/194; 380/2; 714/30, 31, 32, 33, 724, 714/725, 726, 727, 729, 731, 733, 734
See application file for complete search history.

(56) References Cited

U.S. PATENT DOCUMENTS 7,218,567 B1 * 5/2007 Trimberger et al. .......... 365/228
7,228,440 B1 * 6/2007 Giles et al. .................... 713/168
7,352,206 B1 * 4/2008 Zhu et al. ......................... 326/38
2006/0109117 A1 * 5/2006 Hsu et al. ...................... 340/571
2009/0235064 A1 * 9/2009 Owens et al. ................. 713/100

FOREIGN PATENT DOCUMENTS

WO   WO 2008150939 A1 * 12/2008 ............. G11C 29/12

* cited by examiner

*Primary Examiner* — Jeffery Williams
(74) *Attorney, Agent, or Firm* — Okamoto & Benedicto LLP

(57) ABSTRACT

A method and apparatuses for securing an integrated circuit (IC) with a self-destruction mechanism are provided. The IC has a tamper detect circuit that will detect unwanted or unauthorized access to the IC. The IC may store configuration and user data in a memory module. The memory module may be an internal or an external non-volatile or volatile memory source. Configuration and user data stored in the memory module is erased when a tamper condition is detected. The IC is powered down after the erase operation is completed. When the IC is powered down, data stored in a static random access memory (SRAM) module in the IC is erased. When the IC is powered up again, the IC will be in a non-operative state as the configuration data has been completely erased.

20 Claims, 5 Drawing Sheets

INTEGRATED CIRCUIT WITH A SELF-DESTRUCTION MECHANISM

BACKGROUND

Integrated circuits (ICs) are used in various applications and devices. ICs in some devices can be configured to store user and configuration data in a memory module. The memory module may be an embedded non-volatile memory (NVM) module that has the capability to retain the stored data even when the device is not powered. However, when the device is used in security-sensitive systems, secured data stored in the NVM module may be accessible to unauthorized individuals.

If the stored data can be read from the system, the data can be stored and used in another similar device. For instance, sensitive data within the system can be retrieved and duplicated in another similar system. Generally, ICs in programmable devices do not have the capability to put the device in a "self-destruction" mode that will automatically erase all user or configuration data stored when the IC detects unauthorized attempts to access the device.

Such devices may be exposed to unwanted access by unauthorized third parties. To prevent this, an IC with a built-in security mechanism is needed. In some systems, there is generally a security feature that will prevent data from being read or transferred through any access port, e.g., through a Joint Test Action Group (JTAG) scan chain. This generally prevents access to configuration data stored within the device. However, in most cases, sensitive user data stored in the NVM within the device may still be accessible through the JTAG interface.

Therefore, in order to ensure that security-sensitive data is protected from unauthorized or unwanted access, it is desirable to have a built-in self-destruction mechanism in such systems. ICs in such systems should be able to perform a self-destruct operation when necessary. The self-destruct operation may erase both the user and configuration data or any other sensitive data that are stored within the system. Such an operation would ensure that the system would be disabled and any sensitive data stored within the system would be erased. It is within this context that the invention arises.

SUMMARY

Embodiments of the present invention include circuits and a method for securing an integrated circuit (IC) with a self-destruction mechanism.

It should be appreciated that the present invention can be implemented in numerous ways, such as a process an apparatus, a system, a device or a method on a computer readable medium. Several inventive embodiments of the present invention are described below.

In one embodiment, a security system for an IC is provided. The system includes an IC with an embedded memory module that is used to store configuration and user data. A scan chain interface module is coupled to the embedded memory module. An input pin on the IC is connected to a tamper detector. The tamper detector is used to identify unauthorized access to the IC. For example, the tamper detector may be a switch or circuit that will send a trigger signal to the IC when it detects an unauthorized attempt to access the system. Within the IC, a controller element is coupled to the input pin on the IC and the scan chain interface. The controller element or controller circuit acts as an intermediary circuit block that receives an input signal, i.e., the trigger signal, and sends that signal to the scan chain interface to erase the contents of the embedded memory module. A control circuit is coupled to an output pin on the IC to control power supply to the IC. The IC is powered down after the data stored in the embedded memory module are erased.

In another embodiment an IC with a self-destruction mechanism is disclosed. The IC has an application module that is connected to a controller circuit within the IC. The application module generates a signal to keep track of the status of operations performed on a memory module. The controller circuit sends instructions through a scan chain interface to overwrite contents of the memory module. The scan chain interface, which has access to data stored in an onboard memory module, is enabled and disabled by the controller circuit. The controller circuit may enable and disable the scan chain interface based on the signal from the application module.

In yet another embodiment in accordance with the present invention, a method for securing an IC is disclosed. The method includes detecting a tamper condition through a circuit in the IC. Once the tamper condition is detected, the IC is placed in a configurable state. Data stored in a memory module is erased while the IC is in the configurable state. The memory module may be an embedded memory module or an external module that is connected to the IC. A power down operation is initiated after the data have been erased and the IC is powered down.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe circuits and a method for securing an integrated circuit (IC) with a self-destruction mechanism.

It will be obvious, however, to one skilled in the art, that the present invention may be practiced without some or all of these specific details. In other instances, well-known operations have not been described in detail in order not to unnecessarily obscure the present invention.

The embodiments described herein provide techniques to create an IC with a self-destruction mechanism in order to protect the IC from unauthorized access. One of the embodiments describes a method for preventing access to the IC by detecting a tamper condition. For example, if the IC detects an attempt to use or read data stored within the device, a self-destruct sequence will be activated. In one of the embodiments, the self-destruct operation erases data stored in the in-system memory module so that when the device is powered up again, the device will be inoperable. The self-destruction mechanism is useful in secured applications such as military, banking and securities systems, among others. The IC is able to execute a self-destruction operation automatically when a tamper condition is detected to ensure that sensitive data stored within the system is not accessible to unauthorized parties. The self-destruction mechanism can ensure that any sensitive data stored within the system is completely erased if the device is tampered with in any way. The self-destruction mechanism also prevents the IC or the overall system from functioning correctly when the device is tampered with.

Figure 1:
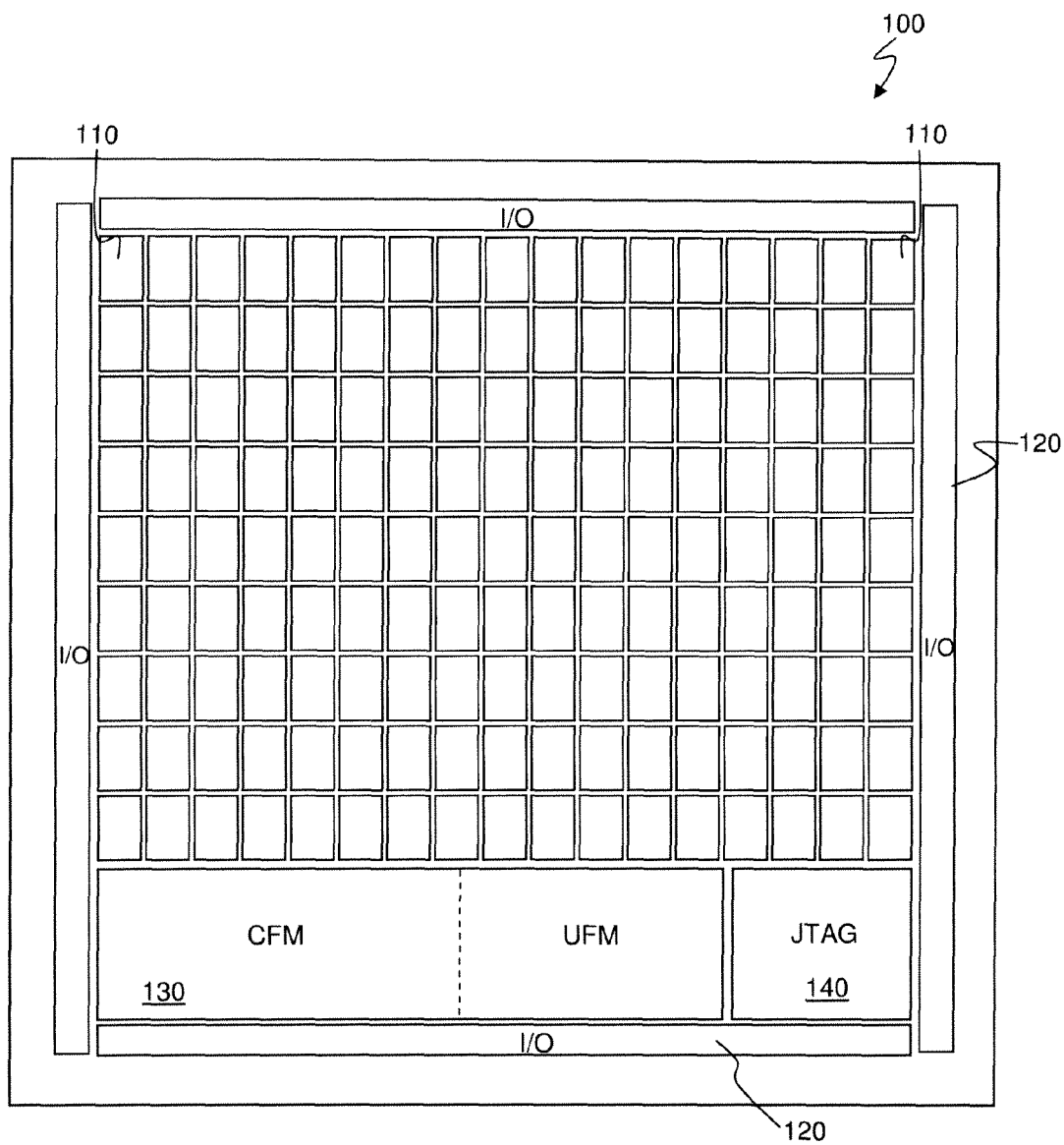
FIG. 1, meant to be illustrative and not limiting, shows a simplified block diagram of a programmable device that can include aspects of the present invention.

FIG. 1, meant to be illustrative and not limiting, shows a simplified block diagram of programmable device 100 that can include aspects of the present invention. Programmable device 100 includes embedded logic array blocks (LABs) 110. Each LABs 110 may include a plurality of logic elements (LEs). An LE is a small unit of logic to implement logic functions and each of the LABs 110 is therefore capable of performing specific logic functions. LABs 110 are interconnected by multiple horizontal and vertical conductors that provide signal interconnects between LABs 110. One skilled in the art should appreciate that any number of logic array blocks may be used even though only a few are shown in FIG. 1. LABs 110 are grouped into a grid array across programmable device 100 with input/output (I/O) elements 120 located at the ends of the arrays of LABs 110. I/O pins or I/O elements 120, located around the periphery of programmable device 100, may support a variety of differential and single-ended I/O standards.

Referring still to FIG. 1, programmable device 100 may also include an embedded memory block 130. Memory block or memory module 130 is placed at the bottom of the array of LABs 110. Memory module 130 may be non-volatile or non-power dependent memory module. In one embodiment, memory module 130 is a flash memory module. Memory module 130 is used to store configuration and user data within programmable device 100. In the embodiment of FIG. 1, memory module 130 is partitioned into two partitions. One partition includes a configuration flash memory (CFM) partition that is used as a non-volatile storage for static random access memory (SRAM) configuration information. The CFM partition within memory module 130 configures LABs 110 and I/O elements 120 at power-up. Another partition within memory module 130 includes a general purpose memory partition for storing user information. The user flash memory (UFM) partition stores user data in programmable device 100. Joint Test Action Group (JTAG) control circuitry 140 is a boundary-scan test (BST) circuitry that complies with IEEE 1149.1-2001. In one embodiment, the JTAG interface is used to configure programmable device 100. In another embodiment, programmable device has a real-time in-system programming (ISP) capability that allows programmable device 100 to be updated without disrupting the operation of programmable device 100. In one such embodiment, the real-time ISP allows memory block 130 to be updated with a new design configuration while the current design continues to operate. The updated memory block 130 configures the new design into SRAM upon the next power cycle.

Figure 2A:
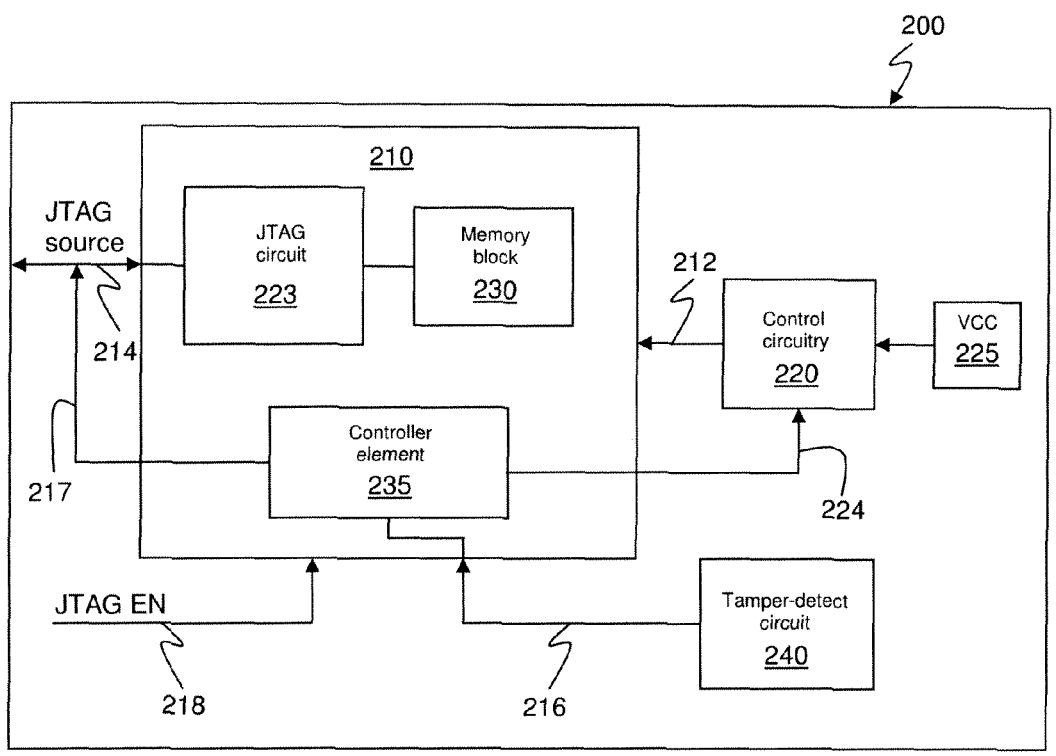
FIG. 2A, meant to be illustrative and not limiting, shows a security system in a device as one embodiment in accordance with the present invention.

FIG. 2A, meant to be illustrative and not limiting, shows a security system in device 200 as one embodiment in accordance with the present invention. In one embodiment, IC 210 is similar to programmable device 100 of FIG. 1. Tamper detector circuit 240 is connected to input 216 of IC 210. Tamper detector circuit 240 is a circuit that is used to detect unauthorized or unwanted access to IC 210. In an exemplary embodiment, tamper detector circuit 240 sends a trigger signal to IC 210 when an unauthorized attempt to access the IC is detected. For example, device 200 may be encased in a case and tamper detector circuit 240 will send out a trigger signal when an attempt to pry open the case is detected. Input 216 sends the received trigger signal to controller element 235. Controller element 235 is coupled to input 216 and output 217. The trigger signal is used to start the memory erase process within IC 210. When a trigger signal is received, controller element 235 sends a configuration instruction to JTAG circuit 223 in IC 210. In one embodiment, controller element 235 sends an appropriate ISP configuration instruction to JTAG circuit 223 to erase memory block 230.

Referring still to FIG. 2A, output 217 is connected to three JTAG input pins. In one embodiment, output 217 is connected to Test Clock (TCK), Test Mode Select (TMS) and Test Data Input (TDI) pins. In another embodiment, output 217 holds the three JTAG input pins to a fixed state when the three JTAG input pins are not in use. For example, the TCK pin is driven low while the TMS and TDI pins are driven high by output 217. When the JTAG input pins are driven or controlled by output 217, any external JTAG source, i.e., any external attempts to communicate with IC 210 directly through JTAG circuit 223, will be blocked. This ensures that the content of memory block 230 is not accessible externally when JTAG circuit 223 is not enabled. When JTAG enable signal, i.e., JTAG EN, coupled to input 218, is asserted, output 217 releases the three JTAG input pins, i.e., TCK, TMS and TDI, to allow an external source to drive the three JTAG pins. In an exemplary embodiment, the JTAG enable signal is coupled to a switch in the security system in device 200 that is not accessible to unauthorized parties. In one embodiment, the JTAG enable signal can be controlled by another module or circuit with additional logic to control the JTAG enable signal.

Referring still to FIG. 2A, after the content of memory block 230 has been erased, IC 210 is powered down. In the embodiment of FIG. 2A, controller element 235 sends a power down signal through output 224 to control circuit 220. Control circuit 220 may be an external circuit that is connected to input 212 to control the power supply to IC 210. In the embodiment of FIG. 2A, control circuit 220 is coupled to power source 225. In one embodiment, the power source is a positive voltage level or VCC. When control circuit 220 receives a power down signal, power to IC 210 is turned off. In an exemplary embodiment, control circuit 220 includes a P-channel metal-oxide-semiconductor field-effect transistor (MOSFET) that has a source and a drain connected to power source 225 and input 212 of IC 210, respectively. The voltage difference between the gate and source of the transistor controls the current flow from power source 225 to IC 210.

Figure 2B:
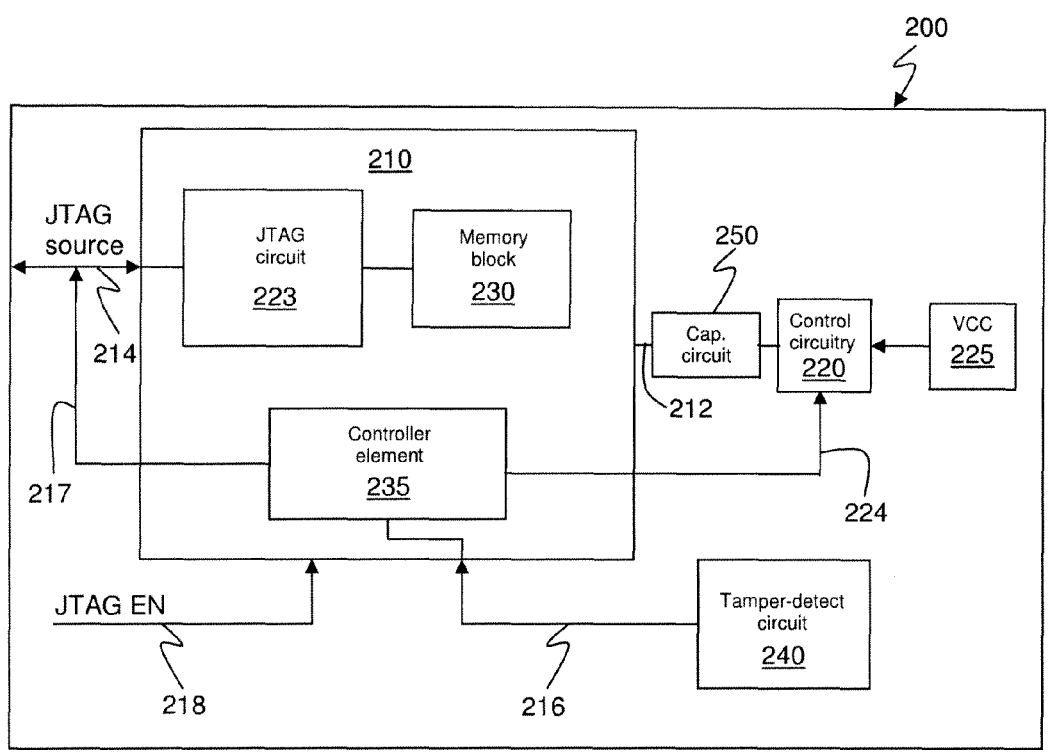
FIG. 2B, meant to be illustrative and not limiting, shows an alternative embodiment for a security system in a device.

FIG. 2B, meant to be illustrative and not limiting, shows an alternative embodiment for a security system in device 200 with capacitor circuit 250. For the sake of brevity, elements shown in FIG. 2A and described in earlier paragraphs, e.g., input 214, input 216, output 217, input 218, JTAG circuit 223, memory block 230 and controller element 235 are not repeated or described in detail here. In the embodiment of FIG. 2B, capacitors are used to store charge so that in case of a power disruption, e.g., power from power supply 225 is cut off, capacitor circuit 250 will be able to provide sufficient backup power for IC 210 to complete the memory erase operation. In one embodiment, capacitor circuit 250 is connected to a capacitor-removal detector circuit to prevent the removal of capacitors within capacitor circuit 250 before IC 210 is powered down. In the embodiment of FIG. 2B, capacitor circuit 250 is coupled to input 212 of IC 210 and control circuit 220. In one embodiment, capacitor circuit 250 is activated by control circuit 220 when a power down signal is received from output 224 and power from power supply 225 is cut off before the contents of memory block 230 are completely erased.

Figure 3:
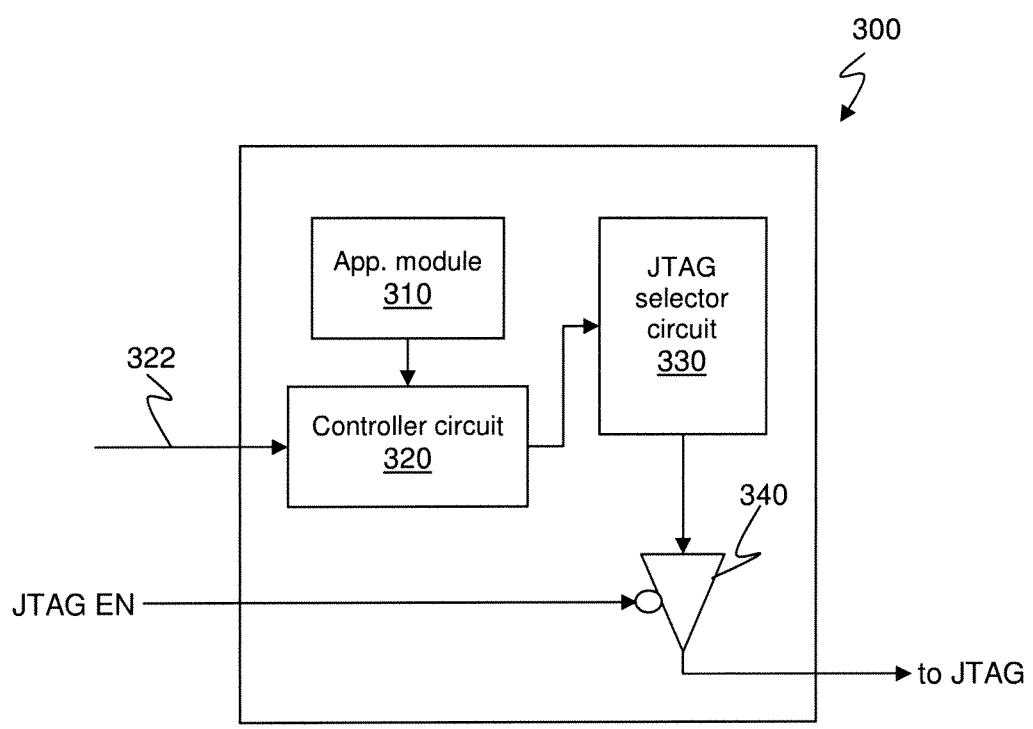
FIG. 3, meant to be illustrative and not limiting, shows an IC with a self-destruction mechanism as another embodiment in accordance with the present invention.

FIG. 3, meant to be illustrative and not limiting, shows IC 300 with a self-destruction mechanism as another embodiment in accordance with the present invention. Application module 310 is connected to controller circuit 320. One skilled in the art should appreciate that application module 310 may be a predefined application that is configured on IC 300. In one embodiment, application module 310 is a user defined functional block. Controller circuit 320 receives a signal from input 322 of IC 300. In one embodiment, the signal from input 322 is an erase trigger signal that comes from a tamper detector circuit external to IC 300. In this embodiment, the tamper detector circuit is an external circuit that is used to detect unauthorized access to IC 300. When controller circuit 320 receives the erase trigger signal from the tamper detector circuit, controller circuit 320 places IC 300 in a configurable state and issues appropriate instructions to the JTAG interface to start a memory erase operation on a memory block. In one embodiment, controller circuit 320 is used to keep track of the memory erase operation. In an exemplary embodiment, controller circuit 320 is coupled to a memory module that issues a busy signal to indicate an ongoing memory erase operation. Controller circuit 320 sends appropriate instructions to the JTAG interface based on the signal from the memory module.

Referring still to FIG. 3, controller circuit 320 is coupled to JTAG selector circuit 330. In one embodiment, JTAG selector circuit 330 is a 2-to-1 multiplexer with a select bit coupled to controller circuit 320. The inputs of the 2-to-1 multiplexer may receive JTAG instructions from different sources. In an exemplary embodiment, one input is coupled to controller circuit 320 and receives the settings for TCK, TMS and TDI pins from controller circuit 320. Another input may be coupled to an I/O pin on IC 300 to receive user inputs, e.g., user-defined settings for the TCK, TMS and TDI pins. In this instance, controller circuit 320 controls the output pins that drive the TCK, TMS and TDI JTAG pins to issue an appropriate instruction to the JTAG interface. In one embodiment, the TCK, TMS and TDI JTAG pins issue instructions to start the memory erase operation on the memory block. The memory may be an embedded memory module within IC 300 or an external memory module that is connected to IC 300. One skilled in the art should appreciate that if an external memory module is used, the signals or instructions to start the memory erase operation on the external memory module may be transmitted directly to the external memory module instead of the JTAG interface of IC 300. JTAG selector circuit 330 determines whether the JTAG interface of IC 300 is controlled by controller circuit 320 or locked at a particular state to prevent external access to the JTAG interface of IC 300. The output of JTAG selector circuit 330 is coupled to JTAG enable circuit 340. In the embodiment of FIG. 3, JTAG enable circuit 340 is a tri-state buffer that is connected to the output of JTAG selector circuit 330. When the JTAG-enable signal is not asserted, IC 300 is not accessible externally through the JTAG interface. In order to use an external JTAG source to communicate directly with IC 300, the JTAG enable signal, JTAG EN, needs to be asserted to allow the external JTAG source to drive the JTAG pins of IC 300. The JTAG enable signal may come from another circuit that is connected to IC 300.

Figure 4:
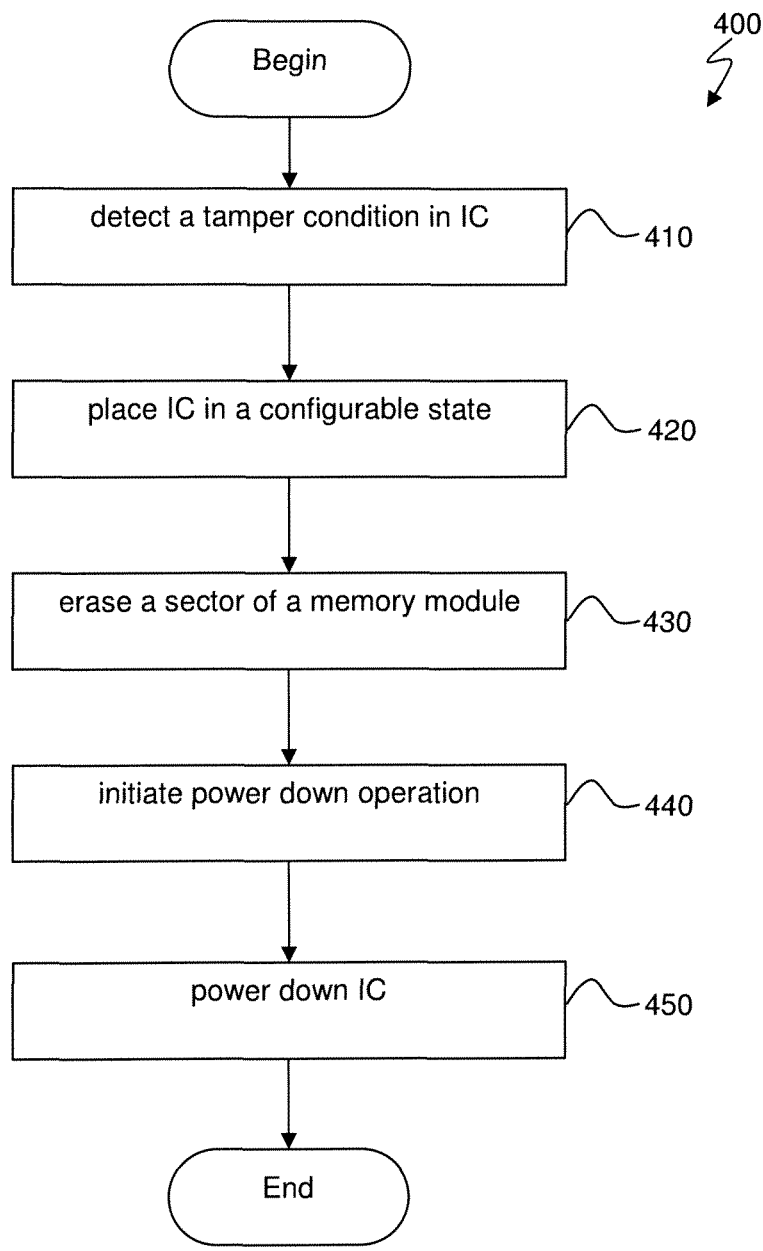
FIG. 4, meant to be illustrative and not limiting, shows a simplified method flow for securing an IC as one embodiment in accordance with the present invention.

FIG. 4, meant to be illustrative and not limiting, shows simplified method flow 400 for securing an IC as one embodiment in accordance with the present invention. A tamper condition is detected in the IC in operation 410. In one embodiment, the tamper condition is detected through a circuit in the IC. The circuit may be similar to tamper detect circuit 240 of embodiment FIG. 2A. The IC is placed in a configurable state in operation 420. In one embodiment, the IC sends an ISP instruction to a JTAG interface to put the device into a real-time ISP mode. A sector of a memory module is erased in operation 430 while the IC is in the configurable state. In one embodiment, the memory module is a flash memory. The memory module may be similar to memory block 130 of programmable device 100 as shown in the embodiment of FIG. 1. In an exemplary embodiment, the memory module is divided into a configuration section and a user section. The contents stored in the user section are erased before configuration data stored in the configuration section of the memory module is erased. In one embodiment, data stored in the memory module is overwritten with a logic value, e.g., 1, when the memory is erased. In another embodiment, data or design stored in the memory module is replaced with an unusable design.

Referring still to FIG. 4, a power down operation is initiated in operation 440 after the memory is erased. In one embodiment, a signal is sent to a control circuit when the power down sequence is activated. The control circuit may be connected to a power supply similar to control circuit 220 shown in the embodiment of FIG. 2A. The IC is powered down in operation 450. In an exemplary embodiment, the powering down of the IC starts a power cycle sequence in the IC so that when the IC is powered up again, the previous configuration data stored in an SRAM module in the IC is erased. The IC is inoperable at this stage as the configuration data used to configure the SRAM module in the IC during the power up operation has been erased in operation 430.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for securing an integrated circuit (IC), comprising:
   detecting a tamper condition via a circuit in the IC;
   placing the IC in a configurable state;
   switching a multiplexer internal to the IC from selecting settings for scan pins from one or more pins of the integrated circuit to selecting settings for scan pins from a controller circuit internal to the IC, thus disabling a scan chain interface in the IC while in the configurable state, wherein the disabling prevents external input to the scan chain interface and external output from the scan chain interface and enables sending an internal instruction from the controller circuit via the multiplexer and the scan chain interface;
   sending, from the controller circuit internal to the integrated circuit, the internal instruction via the scan chain interface, with the external input prevented, wherein the internal instruction directs erasing a specified sector of a memory module;
   initiating a power down operation in the IC; and
   powering down the IC.

2. The method of claim 1, wherein the powering down the IC erases data in a static random access memory (SRAM) module in the IC.

3. The method of claim 1, further comprising:
   erasing a plurality of sectors of the memory module; and
   erasing a configuration memory module in the IC before the initiating of the power down operation.

4. The method of claim 3, wherein the erasing the plurality of sectors of the memory module erases user data stored in the memory module.

5. The method of claim 3, wherein the erasing the configuration memory module erases configuration data used to configure a static random access memory (SRAM) module in the IC during a power up operation.

6. The method of claim 1, further comprising:
   disabling the scan chain interface based on an enable signal.

7. The method of claim 1, further comprising:
   storing charge in a capacitor before the erasing of the sector of the memory module, wherein the stored charge is used as a backup power supply to the memory module.

8. The method of claim 1, further comprising:
   configuring a non-volatile memory module with a predefined design before the powering down of the IC, wherein the predefined design replaces configuration data in a static random access memory (SRAM) module in the IC during a power-up operation.

9. The method of claim 1, wherein the initiating a power down operation comprises sending a power down signal to a control circuit, wherein the control circuit controls a power supply coupled to the IC.

10. An integrated circuit (IC) comprising:
    a memory module;
    a scan chain interface coupled to the memory module;
    a controller circuit configured to send a configuration instruction to the scan chain interface while external access to the IC via the scan chain interface is blocked, wherein the configuration instruction directs erasing of a specified sector of the memory module; and
    a multiplexer coupled to the controller circuit to receive settings for scan pins from the controller circuit, coupled to one or more pins of the IC to receive settings for scan pins from the one or more pins of the IC, and coupled to the scan chain interface, the multiplexer configured to select whether the settings for scan pins from the controller circuit or the settings for scan pins from the one or more pins of the IC are coupled to the scan chain interface in accordance with selection by the controller circuit.

11. The IC of claim 10, wherein the memory module is partitioned into a plurality of sections, a first section is configured to store user data, and a second section is configured to store configuration data.

12. The IC of claim 11, wherein the user data is erased before the configuration data is erased.

13. The IC of claim 10, wherein the controller circuit sends the configuration instruction in response to a trigger signal from a tamper detector circuit, wherein the tamper detector circuit detects unauthorized access to the IC.

14. The IC of claim 10, wherein the controller circuit is configured to send a signal to a control circuit to initiate a power down operation.

15. The IC of claim 14, wherein the IC is powered down after the content of the memory module is erased.

16. A security system for an integrated circuit (IC) device, comprising:
    an IC with an onboard memory module;
    a scan chain interface coupled to the onboard memory module;
    a tamper detector coupled to an input pin of the IC, the tamper detector configured to identify an unauthorized access to the IC;
    a controller element coupled to the tamper detector and coupled by a multiplexer to the scan chain interface, wherein the controller element is configured to send a signal to the scan chain interface to erase a specified sector of the onboard memory module, wherein the signal is sent via the scan chain interface while external access to the IC via the scan chain interface is blocked by the multiplexer; and
    a control circuit coupled to the IC, wherein the control circuit is configured to control power supply to the IC.

17. The security system of claim 16, further comprising a capacitor coupled to the control circuit and the IC, wherein the capacitor stores charge to prevent power disruption to the IC.

18. The security system of claim 16, further comprising:
a second tamper detector coupled to the capacitor, wherein the second tamper detector is configured to detect a removal of the capacitor.

19. The security system of claim 16, wherein the controller element is configured to send a second signal to the control circuit to initiate a power down operation.

20. The security system of claim 16, wherein the control circuit includes a P-channel metal-oxide-semiconductor field-effect transistor (MOSFET).

* * * * *